Sept. 23, 1969 R. COLLOMP ET AL 3,468,305
ELECTRO-MECHANICAL MASSAGE APPARATUS
Filed March 14, 1966 4 Sheets-Sheet 1
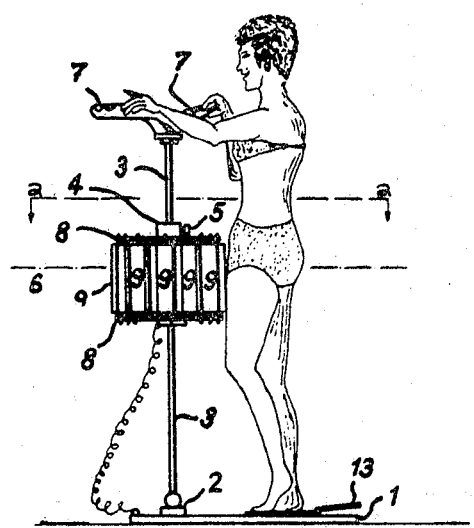
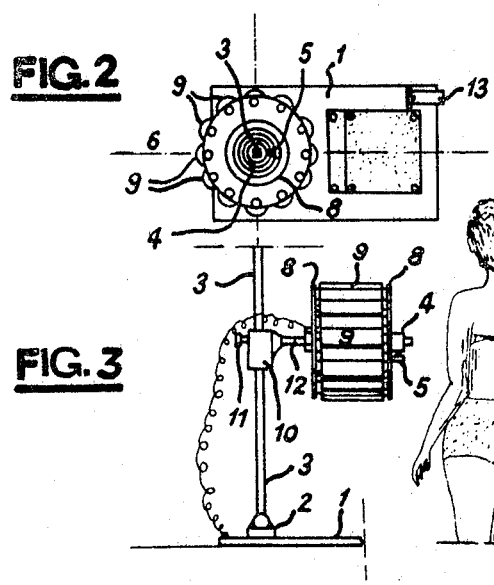

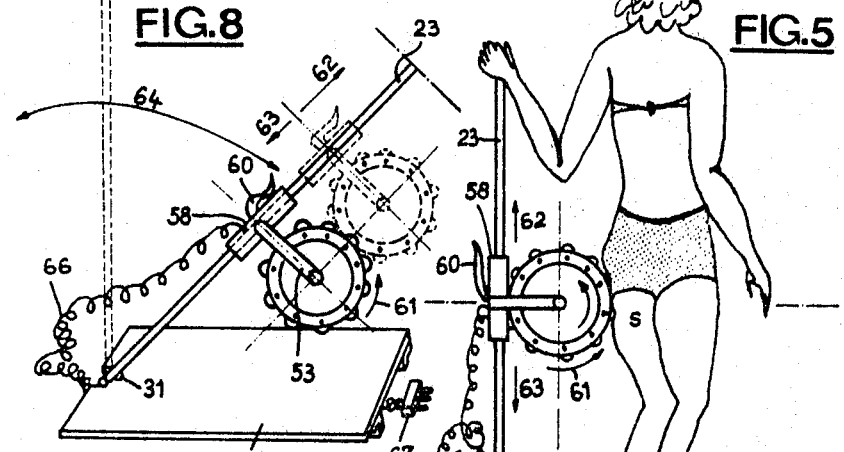

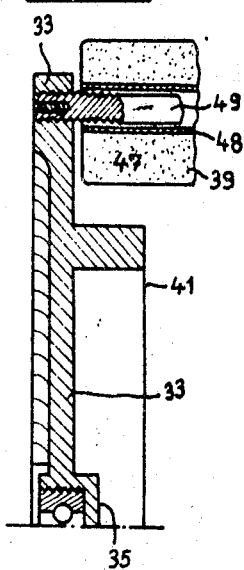
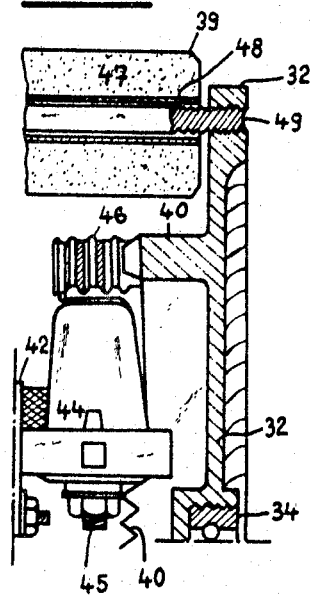
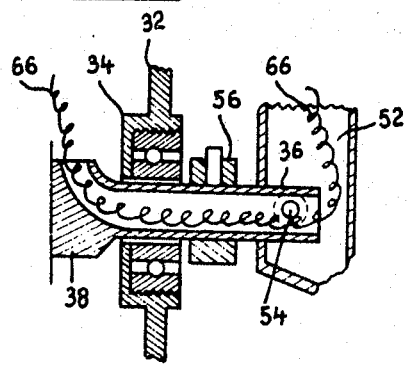
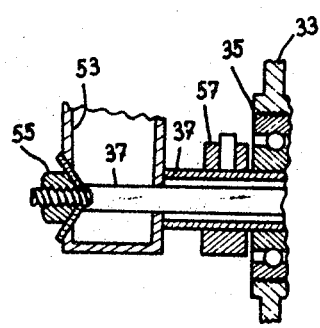

United States Patent Office 3,468,305
Patented Sept. 23, 1969

3,468,305
ELECTRO-MECHANICAL MASSAGE APPARATUS
Raymond Collomp and Suzanne Collomp, both of 63 La Canebiere, Bouches-du-Rhone, Marseille, France
Filed Mar. 14, 1966, Ser. No. 534,039
Claims priority, application France, Mar. 17, 1965, 20,925; Dec. 22, 1965, 21,246
Int. Cl. A61h 15/00, 29/00
U.S. Cl. 128—57    3 Claims

ABSTRACT OF THE DISCLOSURE

An electro-mechanical massage device enabling a person to massage any part of his body with an adjustable pressure and including a stand, a rod mounted on the stand and adjustable in all directions, a rotary massaging drum carried by the rod, a plurality of massaging devices on the drum and an electric motor for rotating the drum, the drum being mounted on the rod selectively in two positions serving for treatment of vertical and horizontal surfaces of the body.

The present invention relates to an electro-mechanical apparatus for massaging of any part of the body, by a massage pressure regulated as desired, the said apparatus being mobile and easily transportable to any part of the room where the massage is carried out.

The apparatus operates by free rollers passing at a suitable speed, in succession and with intervals between them, over the part to be passaged, each roller itself rotating on contact with the body, the sequence in their movement being obtained by the fact that they are freely mounted on the periphery of a rotary drum set in motion by electrical means.

This rotary massage drum is mounted on a small fixed frame which can be placed in either of two different positions, in order to provide two different massaging directions, on a supporting rod attached by a bottom swivel to a stand which can be moved about without difficulty and on which the user stands upright, this supporting rod being operated manually by the user and being adjustable in all directions, so that the rollers will act in the direction desired and exert the required pressure on the body.

The operating positon of the rotary massage drum in respect of the adjustable supporting rod can be selected by the used of either of two different connecting sleeves integral with the small frame, one or other of them being mounted on the said rod, the directions of these two sleeves being perpendicular to each other, one sleeve mounted on the rod producing a vertical massaging action on a part of the body, while the other sleeve mounted on the rod causes the massaging action to tbe exerted horizontally. The combination of the positoning of the stand, the directional adjustment of the supporting rod, the height at which the drum is mounted on this rod and the choice of the connecting sleeve used for affixing the drum to the rod makes is possible to cause the rollers to act on any part of the body, no matter what its position, and at the desired pressure, which is governed by the pressure by which the user pulls the supporting rod towards him.

If the drum and the small supporting frame are held in the hand instead of being mounted on the supporting rod on the stand, the apparatus froms a free massaging device operated entirely manually.

The supporting rod can be fitted at the top with a knob for adjusting its direction or angle of inclination.

The supporting rod can be mounted on the stand by some device equivalent to the swivel but ensuring that if the said rod is released after being inclined towards the front of the said stand the rod is properly centred and its free fall limited; this device may also be constructed in such a way as to enable the rod to be concealed under the stand when the apparatus is not in use and to be put away in reserve; this means consists of a triangular notch on the rear edge of the stand and a shaft positioned lower down than the general level of the stand, the rod terminating in a ring by which it is mounted on the said shaft, a diametral and lateral clearance being provided around the shaft in order to enable the latter to assume oblique positions in all directions.

The supporting rod may be made in one single piece or consist of a number of parts which can be combined or separated.

In the case of the use of an electric motor of standard type, the latter is placed in the rotary drum, of which the rotating shaft is rigid and supports the motor, the cheeks of the drum rotating on this shaft, the motor operating at least one of the cheeks, via a reduction gearing, with the use of a toothed wheel integral with the driven cheek and positioned on the internal surface of the latter.

In an alternative version of the invention, if a battery of rotating massage drums is to be used, for example, in a massage room, with the action of water, or under water jets, then in order to avoid the inclusion of any electrical part in the drum itself the toothed wheel is mounted on the external surface of the cheek of the drum, and the pinion by which it is driven is likewise external to the drum; the appropriate movement is transmitted to the said pinion from a distant motor common to all the units of apparatus.

In a first system for mounting the drum on the adjustable supporting rod the drum is provided with a fixed axial connecting sleeve, an additional rod being provided with a further connecting sleeve, termed the additional connecting sleeve, and forming an angle of 90° with this latter; each connecting sleeve is provided with a device by which it can be secured in posiiton on the rod on which it is mounted (on the first rod or on the second rod, as the case may be).

In a second solution, the drum is fitted with a small permanent frame, in the form of a "stirrup," external to the said drum and supporting the latter by its fixed shaft, which extends outside the cheeks of the drums; a drums; a main connecting sleeve is affixed to the cross piece of the stirrup, perpendicularly to it and to the general plane of the stirrup; another connecting piece termed the addition connecting sleeve, is affixed along one of the two arms of the stirrup, and parallel to the general plane of the latter; the main connecting sleeve alone is fitted with a means for securing it at the desired point along the supporting rod.

Further characteristics of the invention will appear from the more detailed description which now follows, by reference to the accompanying drawings, which illustrate, as examples without any limitative effect, certain ways in which the apparatus may be constructed.

First mounting system, with drum having an axial connecting sleeve

FIG. 1 shows, in elevation, the complete apparatus in use for the massage of a vertical part of the body, from the front.

FIG. 2 is a horizontal projection of the apparatus, along the line a—a with the handle removed.

FIG. 3 shows in elevation, and without the handle, an alternative position of the drum, for the massaging of the horizontal part of the body.

FIG. 4 shows the apparatus as in FIG. 1 but used for the massaging of the rear part of the body, and slightly to one side.

Second mounting system, the drum having a small "stirrup type" frame

FIG. 5 shows, in elevation, the apparatus in use for the massage of a vertical part of the body from the rear.

FIG. 6 is a profile view of the apparatus in use for the massage of a horizontal part of the body, the apparatus being mounted by the additional connecting sleeve of the supporting rod and capable of sliding up and down the latter, without any device for securing it in position.

FIG. 7 is a front view of the apparatus shown in FIG. 6.

FIG. 8 is a view, in perspective, of the apparatus shown in FIG. 5, after it has been released, its fall towards the front having been stopped and centred (the dotted line shows an alternative position for the massage drum).

FIGS. 9–14 relate solely to the stand and to the supporting rod: FIG. 9 is a plan view and FIG. 10 a view in elevation of the supporting rod above the stand, the rod being limited and centred in its forward fall; FIG. 11 is a view, in elevation, of the supporting rod put away under the stand. On a larger scale FIGS. 12–14 are detailed diagrams of the system of joints by which the bottom of the supporting rod is attached to the stand (sections AA, BB and CC).

Figure 15:
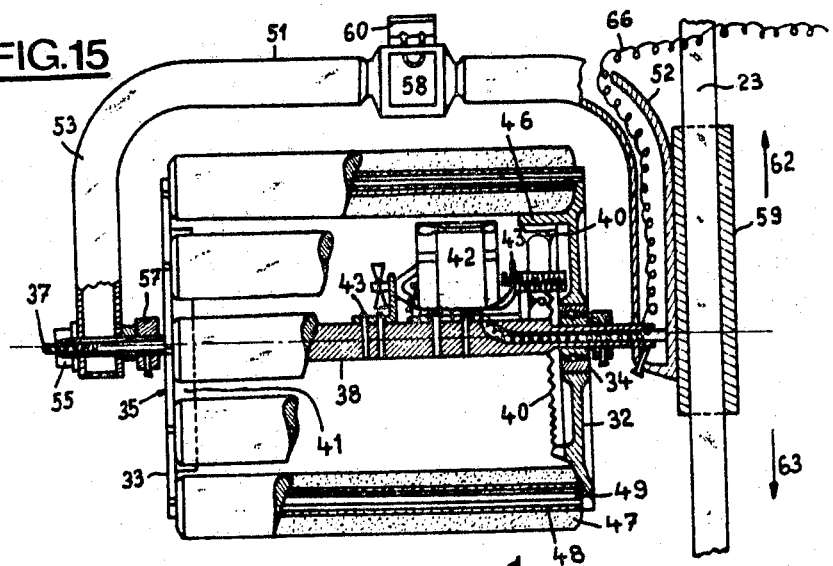
Figure 16:
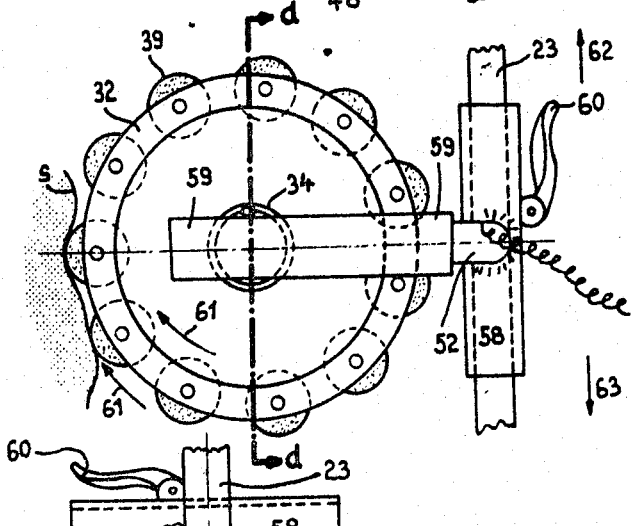
Figure 17:
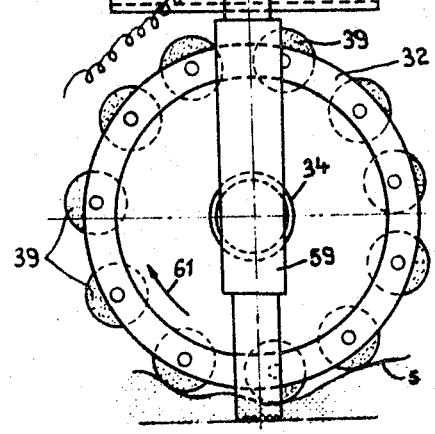

FIGS. 15–17 relate solely to the massaging drum, shown on a larger scale with its constituent parts illustrated in detail. The section MM of FIG. 16 is shown by FIG. 18 and 19, which are drawn to a still larger scale, and also FIGS. 20 and 21, for which the vertical axial section MM is to be considered in FIG. 17.

In these drawings:

FIGS. 1–4.—The supporting rod 3 is mounted by the swivel 2 on the stand 1. The main connecting sleeve 4, with its needle screw 5, is axial in respect of the massaging drum 6; the top of the rod 3 terminates in the handle 7; the drum 6 comprises two cheeks 8 of which the circular periphery is fitted with freely rotating rollers 9. The additional connecting sleeve 10, with its needle screw 11, is integral with the additional rod 12 and perpendicular to it (at an angle of 90°). A switch 13 is fitted to the foot of the stand 1; FIG. 4 shows a manual switch on the handle 7 (13').

FIGS. 5–21.—The supporting rod 23 is fitted to the stand 21 by the shaft 22 and a ring 24 which forms the termination of the rod on the side corresponding to the said stand; the said shaft 22 is situated on bearings 25, at a lower level than the plane, the plate forming the stand; a diametral clearance 26 is provided between the shaft and the hole by which it passes through the ring 24; two stop-rings 27 and 28, secured in the desired position of the shaft 22 by pressure screws, position the ring 24 on the shaft but leave a lateral clearance 29 on either side of the ring 24. These diametral and lateral clearances enable the rod 23 to be placed in various oblique positions between the extreme points $o$ and $o'$. A notch 30 on the rear edge of the plate 21 enables the rod 23 to assume positions above the said plate and forms a front stop to limit the angle of obliquity in this direction; the triangular or equivalent shape of the base 31 of the said notch limits the forward fall of the rod 23 and centres it when it is left to itself after being inclined at any angle towards the front. The rod 23 can be put away under the stand 21 as shown in FIG. 11.

The rotary drum comprises two circular cheeks, the "driving cheek" 32 and the "driven cheek" 33, mounted by ball bearings 34 and 35 respectively on the extremities 36 and 37 respectively of the fixed shaft 38; the massage rollers 39 interconnect these two cheeks, being positioned as generators of a theoretical peripheral cylinder, and extending towards the outside (as clearly seen in FIGS. 15–19).

The driving cheek 34 is provided, on its internal surface, with a toothed wheel 40, the other cheek 33 being provided, for the purpose of general equilibrium, with a similar rim 41 but without teeth.

The electric motor 42 is firmly mounted on the fixed shaft 38, between the two cheeks, by means of the supports 43. The motor shaft terminates in a worm which drives a helicoidal pinion, forming a speed reducer 44. The shaft 45 of this latter is fitted at its end with a pinion 46 which engages the toothed wheel 40.

Each massage roller consists of a tube 47 of thick flexible rubber, surrounding a co-axial anti-friction tube 48 which, in its turn, surrounds a metal rod 49, mounted by its two ends on the edges of the cheeks 32 and 33.

The small "stirrup type" frame 50, external to the drum, consists of a cross-piece 51 parallel with the fixed shaft 38 and of two mutually parallel arms 52 and 53. The fixed shaft 38 is supported by its extremities 36 and 37 on the respective ends of the arms 52 and 53, a securing device being provided to prevent rotation or longitudinal displacement (pressure screw 54 on arm 52, similar means or nut 55 on arm 53). The drum is laterally positioned on the fixed shaft 38 by two rings 56 and 57.

The stirrup type frame bears the main connecting sleeve 58 on the cross-piece 51 and the additional connecting sleeve 59 on the arm 52; a handle 60, with a friction break, serves to secure or release the connecting sleeve 58 on the rod 23.

The arrows 61 indicate the direction of rotation of the drum in relation to the surfaces $s$ being massaged; the arrows 62 and 63 indicate the directions in which it is possible to modify the positions from the connecting sleeve mounted on the rod 23; the arrows 64 indicate the variations obtainable, towards the front or towards the rear, in the angle of obliquity of the rod 23, and the way in which it can be concealed under the stand 21; the arrows 65 indicate the lateral variations of obliquity of the rod 23 in respect of the stand 21.

The current conductors and ground conductor are indicated by 66 and a three-wire plug by 67.

We claim:

1. An electro-mechanical massage apparatus permitting regulation of the massaging pressure as desired by the user, comprising a stand, an adjustable supporting rod mounted on the stand, a rotary massaging drum carried by the rod, a plurality of massaging devices on said drum, and an electric motor for rotating said drum, said rotary massaging drum being fitted axially with a non-rotating sleeve to enable it to be mounted selectively directly on said adjustable supporting rod and on an additional rod having an end fitted with a connecting sleeve similar to said first connecting sleeve but forming an angle of 90° therewith, said supporting rod being mounted on a ring on a shaft positioned below said stand, a clearance being provided in all directions in order to enable various angles of obliquity to be obtained, said stand having a rear edge provided with a notch to enable said supporting rod to be placed above the stand surface and below it for periods when the apparatus is not in use, said notch being in the shape of a V, of which the point is in the front, for centering said rod and preventing its forward fall in respect of the stand when the apparatus is left to itself after a massaging operation.

2. Apparatus according to claim 1, wherein said drum has two cheeks and a fixed shaft, and said motor is positioned in said drum, said motor being operatively connected to said drum by a speed reducer and an internal toothed wheel integral with one of said two cheeks.

3. Apparatus as claimed in claim 2, wherein said rotary massage drum is supported by a two-armed stirrup-shaped frame having a cross-piece and bearing said two connecting sleeves, providing a choice between two different systems for mounting said drum on said supporting rod, one connecting sleeve being positioned on the cross-piece of the stirrup, and the other on one arm of the stirrup, perpendicularly in respect of the first connecting sleeve, said two arms of said frame also enabling said rotary drum to be held in both hands, without mounting it on said supporting rod, in the case of light manual massaging operations.

References Cited

UNITED STATES PATENTS

| | | |
|---|---|---|
| 787,168 | 4/1905 | Gibson. |
| 1,643,039 | 9/1927 | Wentz _____ 128—57 |
| 2,976,867 | 3/1961 | Schaeffer _____ 128—57 |

FOREIGN PATENTS

| | | |
|---|---|---|
| 41,798 | 4/1910 | Austria. |
| 195,292 | 3/1923 | Great Britain. |

L. W. TRAPP, Primary Examiner